US009589472B2

United States Patent
Resnick et al.

(10) Patent No.: US 9,589,472 B2
(45) Date of Patent: Mar. 7, 2017

(54) RUNWAY INCURSION DETECTION AND INDICATION USING AN ELECTRONIC FLIGHT STRIP SYSTEM

(71) Applicant: Raytheon Company, Waltham, MA (US)

(72) Inventors: Herbert L. Resnick, Needham, MA (US); Colin R. Greenlaw, Marlborough, MA (US); Kevin M. Graue, Lowell, MA (US)

(73) Assignee: Raytheon Company, Waltham, MA (US)

( * ) Notice: Subject to any disclaimer, the term of this patent is extended or adjusted under 35 U.S.C. 154(b) by 233 days.

(21) Appl. No.: 14/493,989

(22) Filed: Sep. 23, 2014

(65) Prior Publication Data

US 2016/0086496 A1    Mar. 24, 2016

(51) Int. Cl.
| | | |
|---|---|---|
| G08G 5/00 | (2006.01) | |
| G08G 5/06 | (2006.01) | |
| H04W 4/02 | (2009.01) | |
| G08G 5/04 | (2006.01) | |
| G01S 13/91 | (2006.01) | |

(52) U.S. Cl.
CPC .......... *G08G 5/0082* (2013.01); *G08G 5/0013* (2013.01); *G08G 5/0026* (2013.01); *G08G 5/0043* (2013.01); *G08G 5/045* (2013.01); *G08G 5/065* (2013.01); *H04W 4/021* (2013.01); *G01S 2013/916* (2013.01)

(58) Field of Classification Search
CPC combination set(s) only.
See application file for complete search history.

(56) References Cited

U.S. PATENT DOCUMENTS

| 5,629,691 | A * | 5/1997 | Jain ........................... G01S 7/06 340/933 |
| 5,740,047 | A * | 4/1998 | Pilley ..................... G01C 23/00 340/961 |
| 6,314,363 | B1 * | 11/2001 | Pilley ..................... G01C 23/00 342/36 |
| 6,486,825 | B1 * | 11/2002 | Smithey ................. G08G 5/065 340/933 |
| 6,606,563 | B2 * | 8/2003 | Corcoran, III .......... G01S 19/17 340/435 |
| 7,414,545 | B2 * | 8/2008 | Vickas .................... G08G 1/166 340/901 |
| 7,765,037 | B2 | 7/2010 | Bagge et al. |
| 2003/0083804 | A1 * | 5/2003 | Pilley ..................... G01C 23/00 701/120 |
| 2003/0135327 | A1 * | 7/2003 | Levine ................ G01C 21/165 701/500 |
| 2004/0225432 | A1 * | 11/2004 | Pilley ..................... G01C 23/00 701/117 |

(Continued)

*Primary Examiner* — Yonel Beaulieu
(74) *Attorney, Agent, or Firm* — Schwegman Lundberg & Woessner, P.A.

(57) ABSTRACT

An electronic flight strip system and method of detecting and indicating runway incursions are disclosed. One such method receives an aircraft location, compares the location to a geofenced area, and generates an indication on the touchscreen display in response to the aircraft location being within the geofenced area without an indication of clearance to enter the geofenced area. The indication may be part of the electronic flight strip associated with the offending aircraft.

17 Claims, 3 Drawing Sheets

(56) References Cited

U.S. PATENT DOCUMENTS

| | | | | |
|---|---|---|---|---|
| 2005/0192738 A1* | 9/2005 | Conner | ............... | G01S 19/15 |
| | | | | 701/120 |
| 2006/0265109 A1* | 11/2006 | Canu-Chiesa | ......... | B64D 43/00 |
| | | | | 701/3 |
| 2007/0010921 A1* | 1/2007 | Ishihara | ............... | G08G 5/025 |
| | | | | 701/16 |
| 2013/0103297 A1* | 4/2013 | Bilek | ............... | G08G 5/065 |
| | | | | 701/120 |

* cited by examiner

RUNWAY INCURSION DETECTION AND INDICATION USING AN ELECTRONIC FLIGHT STRIP SYSTEM

TECHNICAL FIELD

Some embodiments pertain to runway incursion detection and indication using electronic flight strips.

BACKGROUND

A runway incursion at an airport includes an aircraft entering a runway without prior approval by an air traffic controller (e.g., tower controller). This may be the result of pilot error or miscommunication between the pilot and the controller. At busy airports, this is a dangerous situation that can result in aircraft accidents when the offending aircraft is hit by another aircraft that is landing or taking off. There is a burden on the controller to monitor all ground traffic to attempt to prevent runway incursions. However, controllers do not have adequate tools to rapidly detect and correct these situations.

DESCRIPTION

Figure 1:
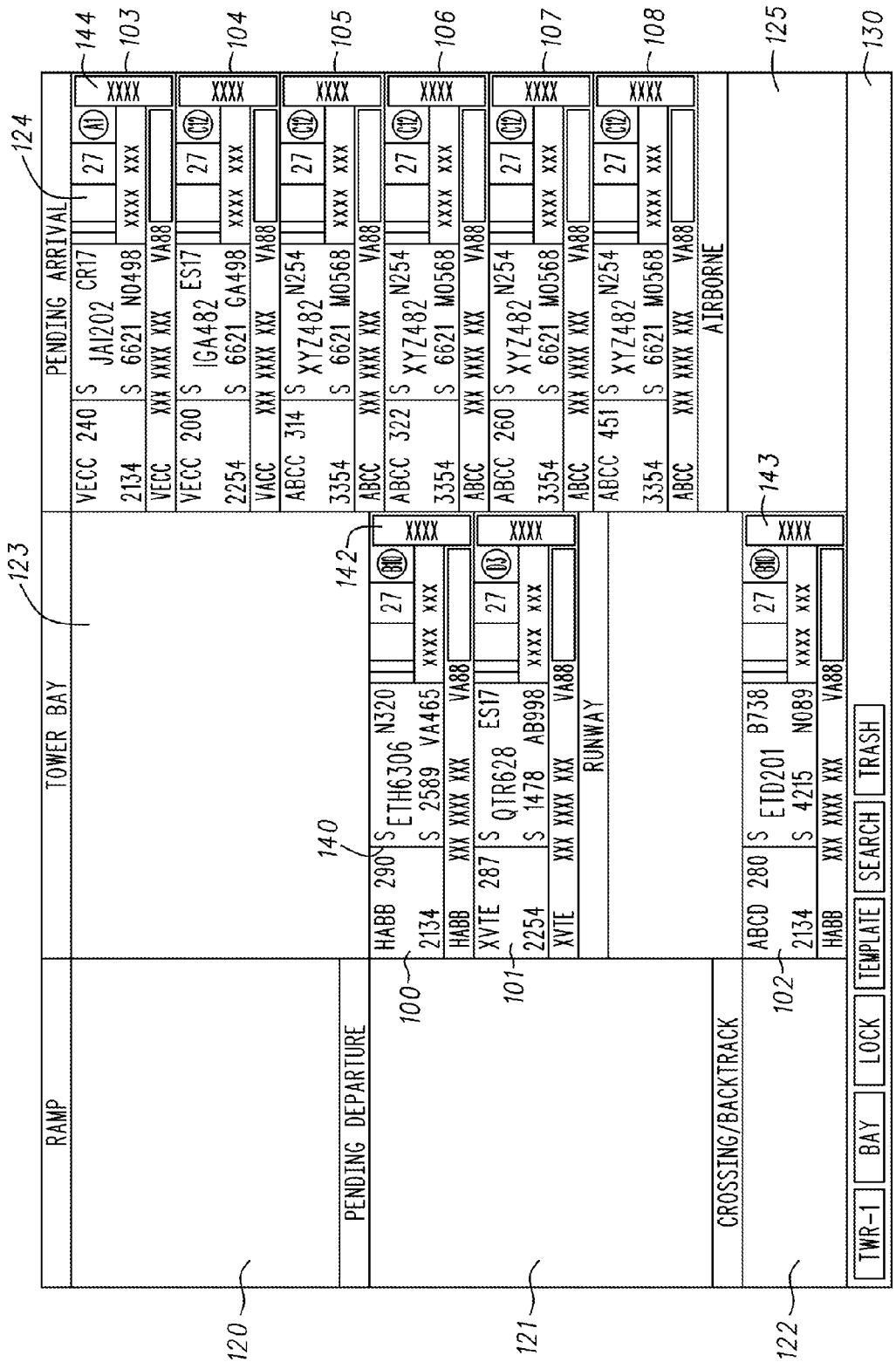
FIG. 1 shows an embodiment of an electronic flight system display that includes electronic flight strips.

ATC facilities can include control towers, terminal radar approach control (TRACON), air route traffic control centers (Center), or flight service stations. Each facility is responsible for different phases of an aircraft's flight. Some of the facilities may share the same physical building while other facilities can be many miles from any airport.

ATC controllers can be assigned to one or more operational roles in an ATC facility. For example, a ground controller has the responsibility for coordinating and tracking an aircraft on the airport (e.g., taxiways) up to, but not on, the runway assigned for departure of that aircraft. A tower controller has the responsibility for providing approval for the aircraft to enter the assigned runway and proceed with take-off.

Presently, air traffic controllers in the U.S national airspace system (NAS) make use of paper flight strips for controlling aircraft under their jurisdiction. For example, in an air traffic control tower, paper strips are physically passed between tower controllers with different roles (clearance delivery, ground control, local air control) with each controller storing the strips in ordered strip bays and making markings on the strips to record interactions with pilots. This system does not provide the controller with real-time feedback as to the status of a particular aircraft.

The present embodiments provide an electronic flight strip (EFS) system that uses an electronic version of the paper flight strips. The EFS System is designed to look and behave like the current paper process employed by air traffic control (ATC) tower controllers using paper strips. By combining position data from a position determination system (e.g., surface surveillance radar, global positioning system (GPS), airport sensors) with the EFS system and establishing a geofence around airport areas to be protected, real-time feedback can be provided to any controller regarding an aircraft entering the protected airport area (e.g. runway) for which it has not been given clearance (e.g., an incursion). Visual and/or aural warnings can be provided to the controller as an indication of the runway incursion. While the subsequent disclosure focuses on runway incursions, various embodiments can provide indications of incursions into any sensitive areas of an airport.

Each controller can have a display position with flight strip bays that have electronic flight strips, as described subsequently. The EFS system allows the controllers to use their current workflow that exists with the current paper flight strips. For example, the electronic flight strips can be "passed" from one bay to another and one flight control position to another. For example, a ground controller can pass, to a tower controller, an electronic flight strip associated with an aircraft that has reached its assigned runway.

The user interface of the EFS system uses touchscreen technology to facilitate ease of use using finger touch for all controller interactions, without the use of a stylus tool such as a pen or other tool to touch the touchscreen surface. Specific operations the controllers currently perform on the paper strips, such as flipping the strip over, adding memory jogger or blank strips, can be performed by the EFS system. Additionally, the electronic strips can display the same information as paper strips but provide the benefit of digital manipulation of the information. The digital information provides the flight data in a more clear representation (i.e., not handwritten) and enables the controller to make modifications easier while retaining the clarity of the information display. Changes to the strip and/or workflow function activation can be accomplished by touching the field to be altered. A popup, context dependent menu is displayed to enable the user to make the appropriate modification(s).

The terms "buttons" and "keypads" used in conjunction with the electronic flight strips and touchscreen displays can refer to physical buttons and keypads as well as areas on a touchscreen surface that provide context-based images of buttons or keypads. The controller can touch the touchscreen surface to provide the same functionality as the physical device.

FIG. 1 illustrates an embodiment of a touchscreen display of the EFS system. Such a display could be used at each controller's station to display a plurality of electronic flight strips 100-108. Smaller versions of this display can also be used to display a more limited number of electronic flight strips 100-108. The display can be a liquid crystal display (LCD), light emitting diodes (LED), cathode ray tube (CRT), or some other type of touchscreen display.

Each electronic flight strip can include information regarding a particular aircraft. For example, the electronic flight strip can include an aircraft designation (e.g., FAA registration number, airline and flight number), the aircraft's destination, aircraft type, and/or aircraft route of flight.

The display can incorporate a graphical user interface to enable the controller to interact with the electronic flight strips 100-108 using the touchscreen technology. The graphical user interface can provide context-based menus and messages that are not possible with paper flight strips.

The EFS system display includes a plurality of "bays" 120-125. Each of these bays 120-125 can be associated with a different phase of an aircraft's flight and/or location on an airport. Each bay can contain one or more electronic flight strips 100-108, each electronic flight strip associated with a different aircraft.

For example, one bay 120 can be associated with aircraft that are currently parked on the ramp awaiting taxi instructions. Another bay 121 can be associated with aircraft that are waiting at a runway pending departure. Another bay 122 can be associated with aircraft that have been given instructions to cross runways or back-track on a runway or taxiway. Another bay 123 can be associated with aircraft that are being handled by local air traffic controllers (e.g., arriving aircraft, landing aircraft, or aircraft traversing airport airspace). Another bay 124 can be associated with aircraft that are pending arrival. Another bay 125 can be associated with aircraft that have just become airborne.

Each of these bays 120-125 can have a header area describing that particular bay's associated flight phase as well as a number indicating a quantity of flight strips 100-108 in that particular bay. The electronic flight strips 100-108 can be moved between the bays by a controller touching and holding a particular location 140 in a main body of the desired electronic flight strip 100 for a predetermined amount of time and then dragging the electronic flight strip 100 to the desired bay.

The EFS system display can also have an information area 130 that can include a local time and date, a Coordinated Universal Time (UTC) (e.g., Greenwich Mean Time (GMT), Zulu Time) as well as additional control buttons. This information area 130 is shown at the lower portion of the screen of FIG. 1 but can be located anywhere on the display.

The electronic flight strips 100-108 can include one touch action buttons 142-144 to initiate context-based actions by the controller touching the button area. Each one touch action button 142-144 can have a different function, that can change dynamically, based on the particular phase of flight represented by the electronic flight strip 100-108 (e.g., which bay 120-125 it is located in). For example, one button 142 can be touched by the controller when an aircraft initially contacts the tower after being handed-off by approach control while inbound on an instrument approach. Another button 143 can be touched by the controller when the aircraft has landed and it is desired to automatically cancel the instrument flight plan. Yet another button 144 can be touched by the controller when it is desired to plan a particular runway at the airport to be used by the arriving aircraft.

These one touch action buttons 142-144 can also automatically move the desired electronic flight strip 100-108 to a next stage of the strip's workflow (e.g., another controller's display, another bay on the same display).

Figure 2:
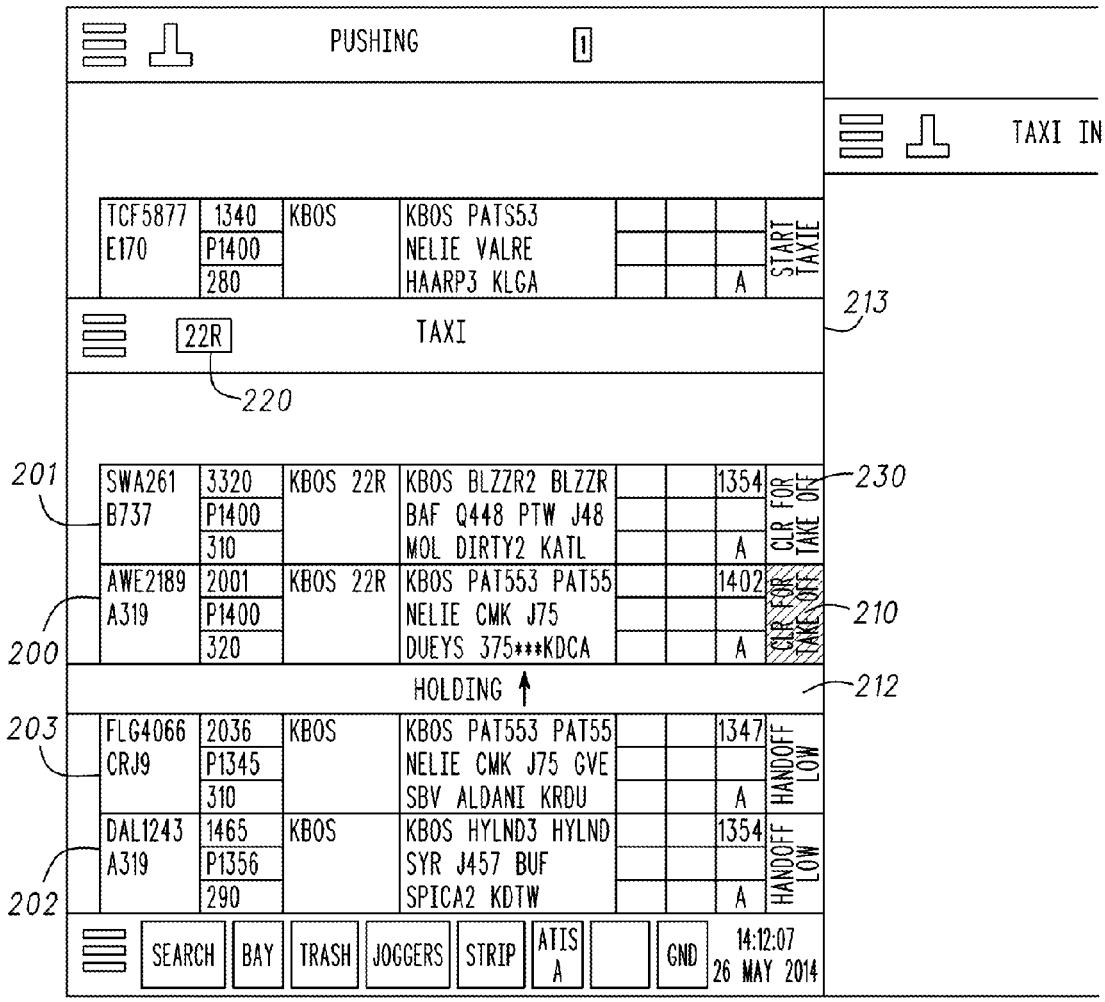
FIG. 2 shows an embodiment of electronic flight strips representing aircraft cleared to taxi to an assigned runway.

FIG. 2 illustrates an embodiment of electronic flight strips in a tower bay of the EFS display of FIG. 1. This figure is a subset of the system of FIG. 1 in order to focus on only those aircraft cleared to taxi to the assigned runway and hold in queue awaiting clearance to enter the assigned runway, enter the assigned runway and hold (e.g., "line-up and wait" (LUAW)), or aircraft that have been cleared for take-off on the assigned runway. The aircraft represented by the electronic flight strips of this figure correspond to the aircraft illustrated in the airport diagram of FIG. 3.

The bay of FIG. 2 includes a bay header 213 that includes the runway number 220 and the bay function (e.g., taxi). A "holding" bar 212 separates flight strips 202, 203 of those aircraft waiting in queue on the taxiway and those aircraft 200, 201 that have entered the runway for either take-off or holding until cleared for take-off. As seen subsequently, not all of the aircraft entering the runway have received the required clearance.

Each electronic flight strip includes a quick action button 230 that a controller can touch when the aircraft represented by the flight strip has been cleared for that function. For example, the quick-action buttons 230 on the illustrated electronic flight strips 200-203 indicate a "HAND-OFF LUAW" function that represents a clearance by the controller to the particular aircraft represented by the flight strip that it has been cleared to enter the runway and hold. An incursion indication 210 is illustrated in a flight strip 200 representing an aircraft that has entered the runway without clearance, as discussed subsequently.

Figure 3:
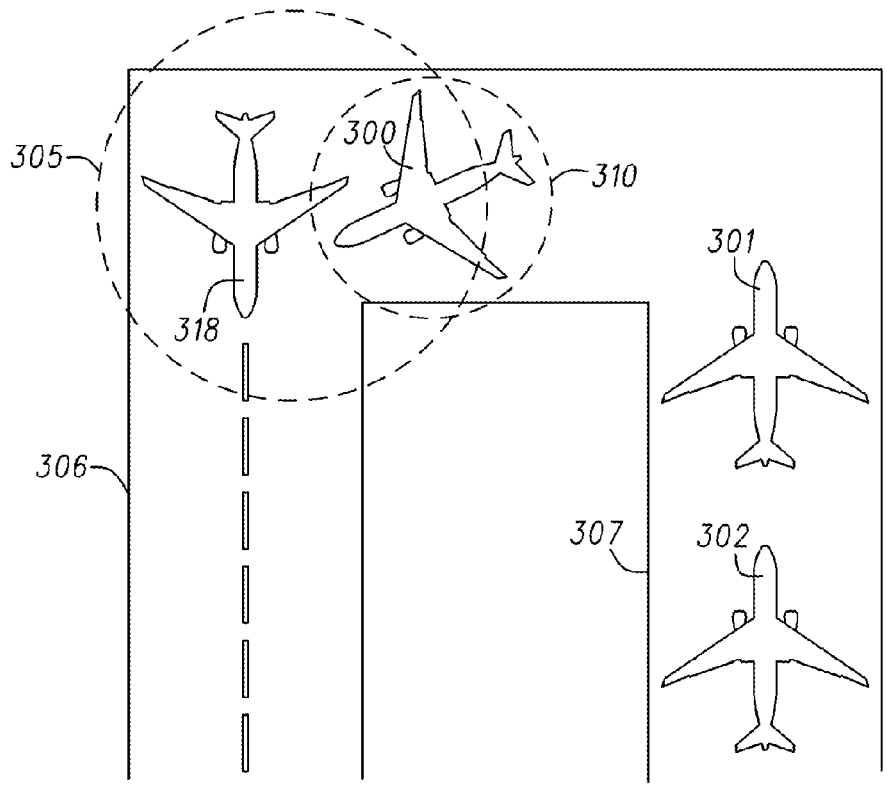
FIG. 3 shows an embodiment of an airport runway diagram including aircraft associated with electronic flight strips in accordance with the embodiment of FIG. 2.

FIG. 3 illustrates an embodiment of an airport runway diagram including aircraft associated with the electronic flight strips in accordance with the embodiment of FIG. 2. The illustrations of FIGS. 2 and 3 are for purposes of illustration only as the present embodiments are not limited to any certain number of aircraft, flight strips, or information/functions on the flight strips.

FIG. 3 shows two aircraft 301, 302 on a taxiway 307 in queue for the runway 306. These aircraft 301, 302 may be represented by the electronic flight strips 202, 203 of FIG. 2 since those flight strips represent aircraft not yet given clearance to line-up and wait on the runway 306.

Two other aircraft 300, 318 may be represented by the electronic flight strips 200, 201, respectively, of FIG. 2. One aircraft 318 is holding on the runway 306. This aircraft 318 was given clearance to enter the runway 306. However, the second aircraft 300 was not given clearance to enter the runway 306 but has crossed lines dividing the taxiway 307 from the runway 306. This runway incursion is indicated to the controller on the flight strip 200.

The runway incursion indication may include, but not be limited to, an inversion of the text of the quick-action button 210, a different color for the button 210, flashing of the button 210, or any combination of these button indications. Additional indications may include, but not be limited to, the entire electronic flight strip 200 experiencing inverse video, various colors, flashing, or any combination of these flight strip indications. An aural alert may also be initiated substantially simultaneously with the screen indication. The aural alert may take the form of a generic tone, a tone assigned only to runway incursions, or a voice alert.

Another indication of the runway incursion may show up on the surface surveillance radar display as a colored shape 310 around the offending aircraft 300. Yet another indication of the runway incursion may include the aircraft symbol itself on the surveillance radar turning color and/or flashing.

The present embodiments are not limited to the above indications of runway incursion. Additionally, any of the above indications of runway incursion may be combined.

FIG. 3 further illustrates a geofence 305 configured at the end of the runway 306. As seen subsequently in the method of FIG. 4, any aircraft whose position is transmitted as being within that geofence 305 without clearance will set off the incursion indications noted previously.

While the geofence 305 is shown at the end of the runway 306 and intersecting taxiway 307, the geofence 305 may be configured at any sensitive location to be monitored for incursions. These sensitive areas may include any intersecting runway/taxiway, hot spots, or any area not within view of the controllers in the tower. For example, if an aircraft on a taxiway that intersects with a runway crosses the runway without clearance to do so, the incursion indication discussed previously may be initiated.

Figure 4:
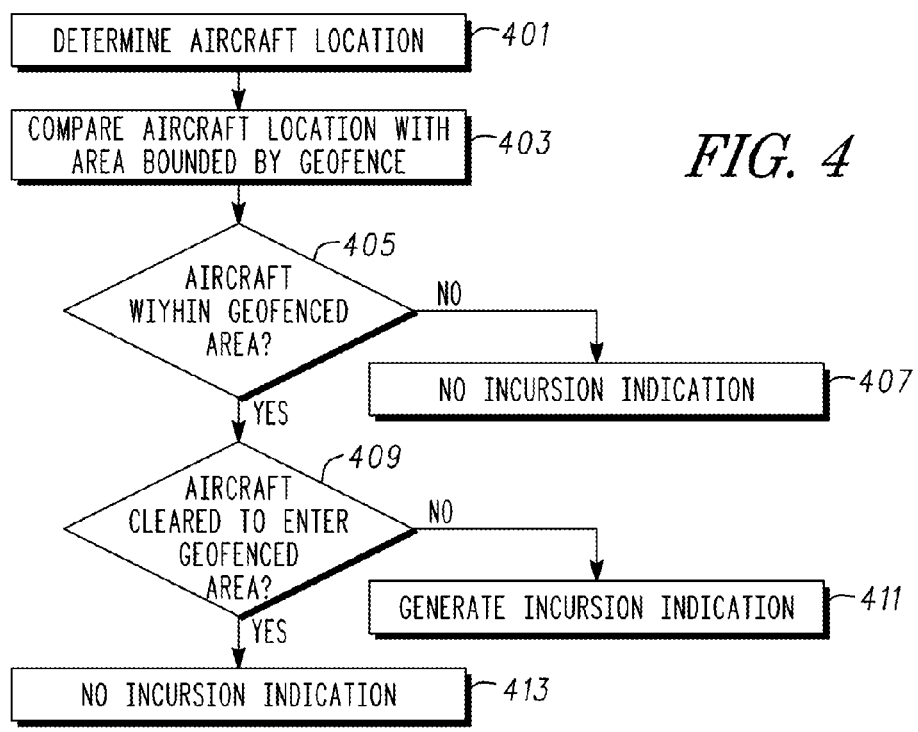
FIG. 4 shows a flowchart of an embodiment of a method for runway incursion detection and indication.

FIG. 4 illustrates a flowchart of an embodiment of a method for runway incursion detection and indication. A geofence, for purposes of the method, is defined as a feature in a software program that uses a position determining system (e.g., global positioning system (GPS)) to define virtual geographical boundaries around a predetermined area.

In block 401, the aircraft location is determined. The aircraft location data comprise geographical coordinates that are received by the EFS system. This may be accomplished by surface surveillance radar generating location data indicative of the location of each aircraft. The surface surveillance radar may use an aircraft's operating transponder that replies to a query from the radar with the aircraft's identification data and location on the airport.

Another embodiment may generate the location data by using a GPS receiver. The data from the GPS receiver may be transmitted to the EFS system to be available to the EFS system controller.

Another embodiment may use a combination of the surveillance radar, the GPS receiver data, and multilateration sensors located around the airport. For example, Automatic Dependent Surveillance-Broadcast (ADS-B) sensors may be used, alone or in combination with the GPS and surface surveillance radar data (e.g., Airport Surface Detection Equipment Model X (ASDE-X)), to determine an aircraft's location on the airport and in relation to the geofenced areas.

In block 403, the aircraft location data is compared with all areas bounded by geofences. This may be accomplished by comparing the geographical coordinates of the aircraft location data with the geographical coordinates bounded by each geofence.

In block 405, it is determined if the aircraft location data are located within any of the geofenced areas. In other words, it is determined if any of the aircraft geographical coordinates are located within the geographical coordinates encompassed by any of the geofences.

In block 407, if the aircraft location is not within a geofenced area, no incursion has occurred. In this case, no incursion indication is generated.

In block 409, since the aircraft location is determined to be within at least one of the geofenced areas, it is determined if the aircraft has clearance to be in that area. For example, this clearance may be in the form of the controller telling the pilot over the radio that the aircraft is cleared to take the runway. The controller can then provide an indication of this clearance by touching a quick-action button 230 as illustrated in FIG. 2.

In block 411, if clearance to enter the area bounded by the geofence was not given (or the controller neglected to provide the indication on the electronic flight strip), an incursion indication is generated. Various embodiments of incursion indications have been discussed previously. The controller can then touch the incursion indication on the touchscreen in order to remove the indication and return the electronic flight strip to its normal, pre-incursion state.

In block 413, if clearance to enter the area bounded by the geofence was given, no incursion indication is generated. This may also be true if the controller accidently provided the clearance indication on the electronic flight strip.

Figure 5:
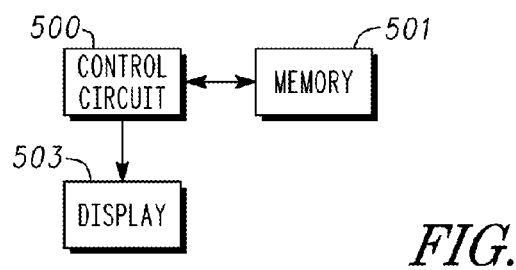
FIG. 5 shows a block diagram of an embodiment of a system in accordance with various embodiments of the EFS system.

FIG. 5 illustrates a block diagram of an embodiment of an electronic system according to various embodiments. The system includes a control circuit 500 (e.g., controller, processor) that executes software instructions representing the method discussed previously.

A memory 501 is coupled to the control circuit 500. The memory is configured to store the flight data, data representing the electronic flight strips, aircraft location data, and other relevant data for any disclosed embodiment. The memory 501 is further configured to store geofence geographical data representing each geofenced area on the airport. The control circuit 500 may then compare received aircraft location geographical data with the geofenced area geographical data stored in memory.

The memory 501 can include read only memory (ROM), random access memory (RAM), non-volatile memory, disk drives, as well as other forms of memory. The memory can include computer-readable storage devices.

A display 503 is coupled to the control circuit 500. The display 503 can encompass one or more displays such as the EFS system touchscreen displays.

Embodiments may be implemented in one or a combination of hardware, firmware and software. Embodiments may also be implemented as instructions stored on the computer-readable storage device, which may be read and executed by at least one control circuit to perform the operations described herein. The computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the system may include one or more processors and may be configured with instructions stored on a computer-readable storage device.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An electronic flight strip system comprising:
a control circuit, coupled to a touchscreen display, configured to receive an aircraft location, compare the aircraft location to a geofenced area, and generate an indication on the touchscreen display in response to the aircraft location being within the geofenced area without an indication of clearance to enter the geofenced area, wherein the indication on the touchscreen display comprises at least one of an inverse video indication in an electronic flight strip associated with the aircraft or a flashing indication in the electronic flight strip, wherein the electronic flight strip comprises fields for an aircraft designation, a destination of the aircraft, and a route of flight of the aircraft.

2. The system of claim 1, wherein the control circuit is further configured to generate electronic flight strips on the touchscreen display, each electronic flight strip representative of an associated aircraft.

3. The system of claim 1, further comprising a memory, coupled to the control circuit, configured to store data representing the electronic flight strips.

4. The system of claim 1, wherein the control circuit is further configured to display a plurality of fields as part of the electronic flight strip and interpret a touch input on a selected one of the plurality of fields as the indication of clearance to enter the geofenced area.

5. The system of claim 1, wherein the control circuit is further configured to return the electronic flight strip to its pre-incursion state in response to a touch input on the display.

6. The system of claim 1, wherein the control circuit is further configured to compare received geographical coordinates for each aircraft, represented by a respective electronic flight strip on the display, with geographical coordinates encompassed by the geofence.

7. The system of claim 1, wherein the control circuit is further configured to receive the aircraft location data from a global positioning system receiver.

8. The system of claim 1, wherein the control circuit is further configured to receive the aircraft location data from surface surveillance radar.

9. A method for operating an electronic flight strip system, the method comprising:
  receiving an aircraft location;
  determining if the aircraft location is within a geofenced area;
  determining if a clearance indication has been received indicating whether the aircraft is to be in the geofenced area; and
  causing a reaction on a display in an electronic flight strip associated with the aircraft when the aircraft location is within the geofenced area and the clearance indication has not been received, wherein causing the reaction on the display in the electronic flight strip comprises generating an indication in a field of the electronic flight strip, wherein the field is associated with the clearance indication and the indication comprises at least one of an inverse video indication or a flashing indication of the field, wherein the electronic flight strip comprises fields for an aircraft designation, a destination of the aircraft, and a route of flight of the aircraft.

10. The method of claim 9, wherein receiving the aircraft location comprises receiving aircraft geographical location data from a global positioning system receiver and/or a surface surveillance radar.

11. The method of claim 9, wherein determining if the aircraft location is within the geofenced area comprises comparing aircraft geographical data, indicative of the aircraft location, with geographical data indicative of boundaries of the geofenced area.

12. The method of claim 9, wherein determining if the clearance indication has been received comprises determining if a touch input has been received on a field in the electronic flight strip.

13. The method of claim 9, wherein the geofenced area is associated with geographical coordinates of an intersection of a runway and a taxiway.

14. The method of claim 9, wherein a position of the electronic flight strip on the display is indicative of the aircraft location.

15. A non-transitory computer-readable storage medium that stores instructions for execution by control circuitry of an electronic flight system to detect and indicate incursions by an aircraft, operations to perform the detection and indication:
  determine if an aircraft location is within a geofenced area;
  determine if a clearance indication has been received indicating whether the aircraft is to be in the geofenced area; and
  cause a reaction on a display in an electronic flight strip associated with the aircraft when the aircraft location is within the geofenced area and the clearance indication has not been received, wherein the reaction on the display in the electronic flight strip comprises generation of an indication in a field of the electronic flight strip, wherein the field is associated with the clearance indication and the indication comprises at least one of an inverse video indication or a flashing indication of the field, wherein the electronic flight strip comprises fields for an aircraft designation, a destination of the aircraft, and a route of flight of the aircraft.

16. The non-transitory computer-readable storage medium of claim 15, wherein the operations further compare aircraft geographical data representative of the aircraft location with geofence geographical data representative of a boundary encompassed by the geofence.

17. The non-transitory computer-readable storage medium of claim 15, wherein the operations further generate an electronic flight strip on the display, each electronic flight strip representative of an associated aircraft and an associated aircraft incursion status.

* * * * *